UNITED STATES PATENT OFFICE.

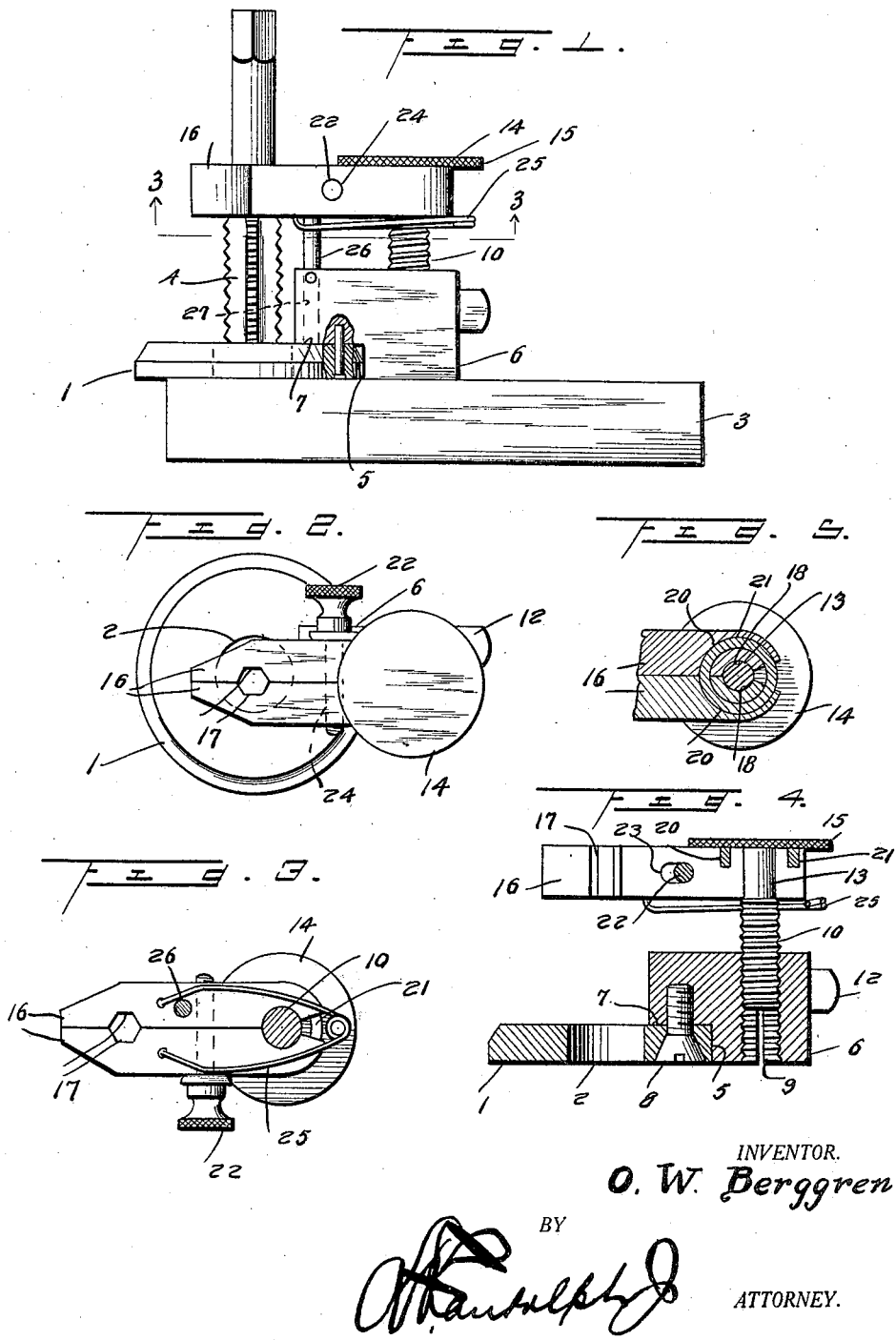

OSCAR W. BERGGREN, OF WALTHAM, MASSACHUSETTS.

TAPPING-BLOCK.

1,392,740.  Specification of Letters Patent.  Patented Oct. 4, 1921.

Application filed August 10, 1920. Serial No. 402,575.

*To all whom it may concern:*

Be it known that I, OSCAR W. BERGGREN, a citizen of Sweden, residing at Waltham, 54, in the county of Middlesex and State of Massachusetts, have invented certain new and useful Improvements in Tapping-Blocks; and I do hereby declare the following to be a full, clear, and exact description of the invention, such as will enable others skilled in the art to which it appertains to make and use the same.

This invention relates to new and useful improvements in tapping blocks and has for its primary object the provision of means whereby a thread cutting bit or similar tool may be alined and maintained in such a position throughout its entire cutting operation, thereby obviating the customary practice of using a square for alining said tool.

Another object of this invention is the provision of a tool gripping element provided with a base and the latter is adapted to rest on the object being tapped and moved with the former in order to maintain said tool in proper alinement.

A further object of this invention is the provision of means whereby the tool guiding element may be adjusted both as to the base and object being tapped so that tools of different sizes may be used.

A further object of this invention is the provision of a tapping block of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a side elevation, illustrating a tapping block constructed in accordance with my invention and showing the same applied to a tool and an object which is being tapped, Fig. 2 is a top plan view illustrating the same, Fig. 3 is a sectional view taken on the line 3—3 of Fig. 1, Fig. 4 is a vertical sectional view illustrating the device.

Fig. 5 is a fragmentary sectional view illustrating the connection between the jaws and the adjusting screw.

Referring in detail to the drawings, the numeral 1 indicates a circular base provided with a centrally arranged circular opening 2 and said base has a flat lower face adapted to rest evenly upon an object 3 which is being tapped by an ordinary tapping tool or thread cutter 4, the latter extending vertically through the opening 2 of the base. The base 1 has a flat edge 5 which is engaged by a block 6. The block 6 is cut away to form angularly related shoulders 7, one of which rests on the top face of the base 1 while the other shoulder engages the flat or straight edge 5 of the base. A screw or like fastener 8 extends through the base and into the block 6 for detachably connecting the base to the block and also the head of the fastener 8 is countersunk in the base so as not to interfere with the base resting evenly upon the object which is being tapped.

The block 6 is provided with a split screw threaded bearing 9 adapted to receive an adjusting screw 10 and said split bearing may have its gripping action on the adjusting screw 10 increased and decreased by an adjusting bolt 12. The upper portion of the adjusting screw 10 is reduced to form a bearing portion 13 and has formed upon its upper end a disk or handle 14 having a knurled periphery 15.

A pair of jaws 16 have tool engaging recesses 17 in their opposing faces adapted to receive a bit or thread cutter 4 below its squared wrench engaging end. The jaws 16 adjacent their other ends are provided with bearing recesses 18 adapted to receive the bearing portion of the adjusting screw and be limited in their downward movement on the bearing portion by the upper convolution of the threads on the adjusting screw. The jaws are also provided with annular alining grooves 20 around their bearing recesses and are adapted to receive an annular flange 21 formed on the disk or handle 14. The jaws 16 are retained in engagement with the bearing portion of the adjusting screws 10 by means of a clamping bolt 22 which extends through a slot 23 in one of the jaws and has threaded engagement with an opening 24 in the other jaw. A spring 25 is secured at its ends to the jaws and straddles the feed screw for the purpose of normally urging the jaws away from each other. A guide pin 26 is carried by one of the jaws and extends into a guide opening 27 formed in the block.

In operation, the base is placed on the object 3 which is being tapped with the tapping tool 4 extending through the central opening 2 and the jaws are applied to the upper portion of the tool. A suitable wrench or handle is applied to the end of the tool so that the same may be rotated to bring about the desired thread cutting action. During the rotation of the tool, the same is held in proper alinement with the object by the jaws, and said jaws may be easily and quickly adjusted with relation to the base to compensate for the advancing of the tool and also permits the use of tools of several sizes.

While I have shown and described the preferred embodiment of my invention, it will be understood that minor changes in construction, combination and arrangement of parts may be made without departing from the spirit and scope of the invention as claimed.

Having thus described my invention what I claim is:

1. A tapping block comprising a base having a central opening to receive a tapping tool, a block secured to said base, and tool guiding jaws adjustably connected to the block and adapted to be applied to the upper portion of the tapping tool.

2. A tapping block comprising a base having a central opening and adapted to receive a tapping tool and rest on the object to be tapped, a block secured to the base, adjustable jaws adapted to be applied to the upper portion of the tool, and means adjustably connecting the jaws to the block.

3. A tapping block comprising a base having a central opening adapted to receive a tapping tool, a block detachably secured to said base, an adjusting screw carried by said block, jaws carried by said screw, and means for causing said jaws to grip the tool.

4. A tapping block comprising a base having a central opening adapted to receive a tapping tool, a block carried by said base and having a split bearing, an adjusting screw in said bearing, means for adjusting the tension of said bearing on the adjusting screw, and adjustable jaws carried by the screw.

5. A tapping block comprising a base having an opening receiving a tapping tool, a block secured to said base, an adjusting screw connected to said block, a pair of jaws having bearing recesses receiving the screw, a disk formed on said screw, said jaws having annular alined recesses, an annular flange formed on said disk and received within said annular recesses, tension means for said jaws, and an adjusting bolt adjustably connecting the jaws together.

6. A tapping block comprising a base, a block secured to said base, and a tool guiding means adjustably secured to the block.

In testimony whereof I affix my signature in presence of two witnesses.

OSCAR W. BERGGREN.

Witnesses:
AXEL R. JACOBSON,
ERNST ANDERSON.